(12) United States Patent
Bove et al.

(10) Patent No.: US 8,184,277 B2
(45) Date of Patent: May 22, 2012

(54) REFLECTION OPTICAL SENSOR FOR DETERMINING THE ANGULAR POSITION OF A ROTATING ELEMENT

(75) Inventors: Angelo Bove, Naples (IT); Giovanni Masotti, Florence (IT)

(73) Assignee: EL. EN S.p.A., Calenzano, Florence (IT)

(*) Notice: Subject to any disclaimer, the term of this patent is extended or adjusted under 35 U.S.C. 154(b) by 365 days.

(21) Appl. No.: 12/528,501

(22) PCT Filed: Feb. 27, 2008

(86) PCT No.: PCT/IT2008/000131
§ 371 (c)(1),
(2), (4) Date: Aug. 25, 2009

(87) PCT Pub. No.: WO2008/105021
PCT Pub. Date: Sep. 4, 2008

(65) Prior Publication Data
US 2010/0026994 A1    Feb. 4, 2010

(30) Foreign Application Priority Data
Feb. 27, 2007  (IT) .................. FI2007A0050

(51) Int. Cl.
*G01B 11/26* (2006.01)

(52) U.S. Cl. .................................... 356/138; 356/614
(58) Field of Classification Search .......... 356/138–140, 356/614–620
See application file for complete search history.

(56) References Cited

U.S. PATENT DOCUMENTS

| 5,245,182 A | * | 9/1993 | Van Rosmalen et al. ..... 250/236 |
| 5,808,727 A | * | 9/1998 | Katayama .................... 356/4.01 |
| 2004/0206894 A1 | | 10/2004 | Oka et al. |

FOREIGN PATENT DOCUMENTS

| EP | 1 371 956 A1 | 12/2003 |
| GB | 919 168 | 2/1963 |

* cited by examiner

*Primary Examiner* — Michael P Stafira

(57) ABSTRACT

The optical device for determining the angular position of a rotating element comprises: a concave mirror (13) integral to one rotating element (7); an electromagnetic radiation emitter (17); at least one electro-optical detector (19R, 19L). The concave mirror, the emitter, and the detector are arranged in such a way that at least a part of the radiation emitted by said emitter is focused by the concave mirror on said at least one detector. The detector produces a signal, which can vary as a function of the position in which the radiation is focused by the mirror on the detector.

24 Claims, 3 Drawing Sheets

REFLECTION OPTICAL SENSOR FOR DETERMINING THE ANGULAR POSITION OF A ROTATING ELEMENT

TECHNICAL FIELD

The present invention generally relates to devices or sensors able to detect the position of an element movable at a freedom degree, and more in particular the angular position of a shaft oscillating or rotating about its axis.

STATE OF THE ART

Accurate and prompt measurement of the rotation of a rotating element, such as the shaft of a limited stroke motor, is required for example in the control of the deflection of a laser beam or of an acquisition system, which uses rotating or oscillating mirrors, for deflecting the radiation in the desired direction. There are different approaches to carry out this measurement. However, many of them are not suitable in applications, which require limited dimensions and oscillations with high angular accelerations and frequencies.

For example, the devices based upon differential transformers have limited applications because of the high moment of inertia of the movable modulating element, and they are too sensitive to the magnetic fields produced by the motor, which drives the movement of the member, whose angular position must be detected by the sensor. This last aspect prejudices the use of any magnetic sensor.

The use of potentiometers is unsuitable for high-speed applications due to the excessive mechanical hysteresis and because of all the problems of electrical noise and of frictions resulting from the sliding contact, which also limits the life of the device.

The capacitive sensors, although promising thanks to their accuracy, need a complex electronics for the excitation and the compensation of the thermal drifts, thus being difficult and expensive to be produced. The devices with rotor plates are significantly affected by the axial movements thereof. Furthermore, the use of a butterfly modulating dielectric element is unsuitable in high speed applications, as the dielectric can deform under the centripetal accelerations, or it presents a high mechanical moment of inertia if stiffened, thus being also insensitive to vibrations.

The optical devices based upon the interception or deviation of the source light by a movable element are affected by numerous problems, among which the main are: non-linearity even on small deviations; sensitivity to the thermal drifts of the source and of the sensitive element; sensitivity to dust and to optical or mechanical imperfections if a butterfly mask is used. The use of more sources and, above all, of more sensitive elements allows compensation of the drifts provided that they are perfectly identical to each other. In any case, this entails a complication of the device to the detriment of the compactedness, and does not eliminate sensitivity to the imperfections of the movable element, to the vibrations, and to the dust.

The sensors based on optical encoders or on array of sensitive elements, even if stable, are bulky, have high inertia, low resolution, and are expensive.

OBJECTS AND SUMMARY OF THE INVENTION

In view of the above, there is the need of producing a sensor, which alleviates at least partially the disadvantages of the known sensors. In particular, there is the need for a device for detecting the displacements, in particular the angular displacements of a rotating or oscillating member, with high accuracy, this device also being of reduced bulk and able to be used also when high-frequency and very fast displacements occur.

According to a first aspect, the present invention relates to a detection device, or position sensor, which can be used for high-speed applications and which affects in an insignificant or anyway acceptable manner the dynamic characteristics of the actuator that imparts the movements to the member controlled by the device itself.

According to a further aspect, the invention relates to an optical detection device, which is compact, suitable for small galvanometric scanners.

According to one embodiment, the object of the present invention is to produce a detection device, which presents a reduced number of elements, is of low cost with respect to other known systems, and whose assembly requires low manufacturing costs.

According to one embodiment, the present invention provide for an optical device for detecting the angular position of a rotating element comprising: a concave mirror integral to a rotating member, such as for example a rotating shaft; one electromagnetic radiation emitter; at least one electro-optical detector. The concave mirror, the emitter and the detector are arranged in such a way that at least a part of the radiation emitted by said emitter is focused by the concave mirror on said at least one detector. Furthermore, the detector produces a signal, which can vary as a function of the position in which the radiation is focused by the mirror on the detector.

As it will be better explained below with reference to one embodiment of the present invention, the combination of these features allows to obtain a sensor or detection device, which is more effective than the known devices and sensors for analogous uses.

Within the present description and the attached claims, rotation should be understood as a movement, which can be angularly limited and/or an alternating angular movement, and rotating element or member should be understood as an element, which performs a movement that can be angularly limited and/or alternating, i.e. an oscillating movement.

In a preferred embodiment of the present invention, the emitter is substantially coaxial to the shaft or other rotating or oscillating member.

In order to obtain a particularly compact device, in one embodiment the emitter and said at least one detector are arranged on a common support, such as for example a single electronic card.

According to a particularly advantageous embodiment of the present invention, in order to obtain a differential measurement, not influenced by errors due to asymmetries of the light beam, the concave mirror comprises a double concavity to focus the electromagnetic radiation on two electro-optical detectors opposite to said mirror. Advantageously, it could be provided that the concavities and the two electro-optical detectors are arranged in symmetrical positions with respect to the axis of rotation or oscillation of the shaft.

A high compactness and easy assembly can be obtained by providing that the emitter and the two detectors are arranged on a common substrate, with the detectors arranged in positions, which are substantially symmetric with respect to the emitter. Preferably, again in order to obtain a more compact and practical item, it could advantageously be provided that the emitter and the detectors are capped inside a resin transparent to the radiation of the emitter.

Preferably, the electro-optical detectors are designed in such a way as to provide a differential signal as a function of the angular position of the mirror.

The two concavities of the mirror can be formed by two specular separate elements. In one embodiment, these elements are rigidly constrained to the rotating shaft. However, the two concavities of the mirror are preferably produced in a single mirror element, rigidly constrained to the rotating shaft. The mirror can be obtained, for example, by molding a synthetic resin, which is then metalized. During molding, in a single block of plastic material the double concavity is obtained.

In one embodiment, each of the electro-optical detectors comprises one cathode and two anodes. Between the two anodes a light-sensitive area is arranged, which extends according to a longitudinal direction between said two anodes. Furthermore, the mirror is positioned so as to focus the electro-magnetic radiation on said light-sensitive area. More in particular, each of the two concavities focuses a part of the electromagnetic radiation on one of the two light-sensitive areas.

In one embodiment, the orientation of the sensitive area of each electro-optical detector with respect to the mirror is such that the rotation of the mirror around the axis of rotation or oscillation of the shaft causes a movement of the spot of radiation focused by the mirror on the respective light-sensitive area of the corresponding electro-optical detector.

In one embodiment, the detector(s) and the emitter are connected to a circuit for conditioning and measuring the signal produced by said detector(s). In one embodiment, the conditioning and measurement circuit comprises an automatic control of the emission intensity of the emitter, in order to maintain the signal delivered by said detector(s) substantially constant by controlling the supply voltage of the emitter. When two electro-optical detectors are provided, the automatic control of the emission intensity of the emitter receives at the input a signal as a function of the sum of the currents generated by said two electro-optical detectors and controls the emitter so that said sum remains substantially constant.

In one advantageous embodiment of the present invention, the conditioning and measurement circuit comprises a compensator of the thermal drift of the sensitivity of said electro-optical detector(s). This compensator can comprise a resistor variable with temperature, for example an NTC resistor.

In order to avoid interferences with the ambient light, in one embodiment the emitter is an infrared emitter and the detector(s) is/are infrared detector(s).

A further object of the present invention is to provide an equipment comprising at least a movable element and an actuator to control said movable member with a rotating movement, in which to said movable member a detection device as defined above is associated. The movable element can be any element, provided that the movement imparted thereto is compatible with the criteria of detection of the rotating or oscillating movement on which the detection system described is base.

BRIEF DESCRIPTION OF THE DRAWING

The invention will be easier to understand by means of the description below and the attached drawing, which shows a non-restrictive practical embodiment of the invention. More particularly, in the drawing.

DETAILED DESCRIPTION OF AN
EMBODIMENT OF THE INVENTION

Figure 1:
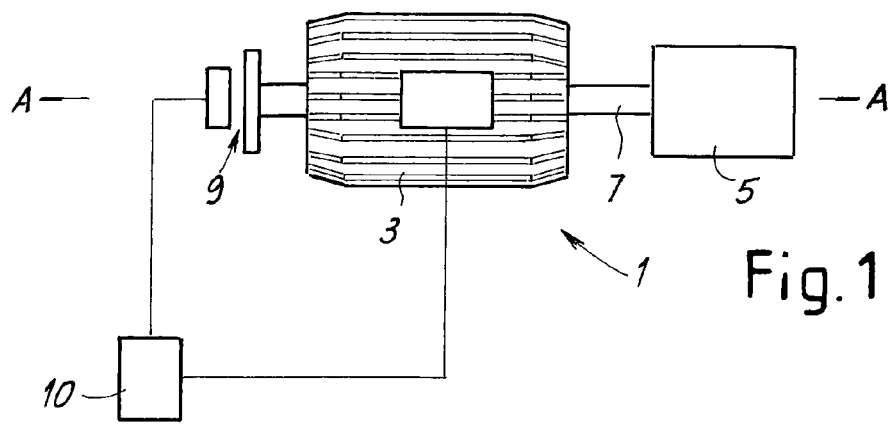
FIG. 1 shows a diagram of a system or device in which the device according to the present invention is used.

FIG. 1 schematically shows an apparatus, indicated as a whole with the number 1, whereto the detection device or sensor of the angular position according to the invention is applied. Number 3 generally indicates an actuator, for example an electric motor, which imparts a movement to a cam follower schematically indicated with the number 5. Said cam follower can be, for example, a mirror for deflecting a laser beam, or any other member that needs to be moved with a rotating movement, wherein rotation means generally also a movement according to a limited angle, i.e. an oscillation. Number 7 indicates a drive shaft, with which is associated a detection device 9 for detecting the angular position of the shaft 7 and therefore of the cam follower 5. Number 10 generally indicates a control unit, interfaced to the sensor or detection device 9 and to the actuator 3. It should be understood that the principles underlying the device described hereunder can be applied also in different apparatuses, where for example the rotating or oscillating member is not a drive shaft, but rather a member of other type, for example a disk, a cam, a rocker arm or any other mechanical member.

Figure 2:
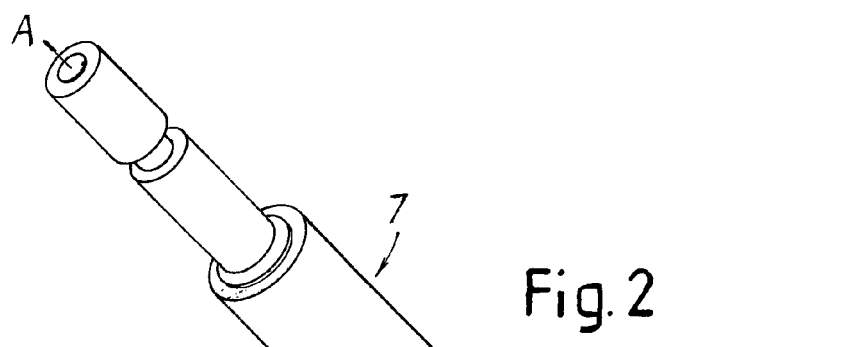
FIG. 2 shows an axonometric view of a rotating shaft with a mirror mounted thereon and a system of emitter and electro-optical detectors opposite to said mirror.

FIG. 2 shows, separately from the actuator 3, the shaft 7 with which the detection device 9 is associated, arranged and integrated at the rear end of the shaft 7. In one embodiment, the device comprises a mirror 13 with a double concavity, torsionally constrained to the shaft 7 and therefore rotating integrally therewith. Reference numbers 13A and 13B indicate the two concavities, with which the mirror 13 is equipped. These concavities are arranged in positions symmetric with respect to the axis A-A of the shaft 7, i.e. with respect to the axis around which the rotation or oscillation movement to be detected by the device 9 occurs.

In one embodiment, the mirror 13 is obtained by injection molding a synthetic resin, for example an acrylic resin. It is made reflecting at least in correspondence of the two surface concavities 13A, 13B by vacuum metalizing, for example of aluminum.

Figure 3:
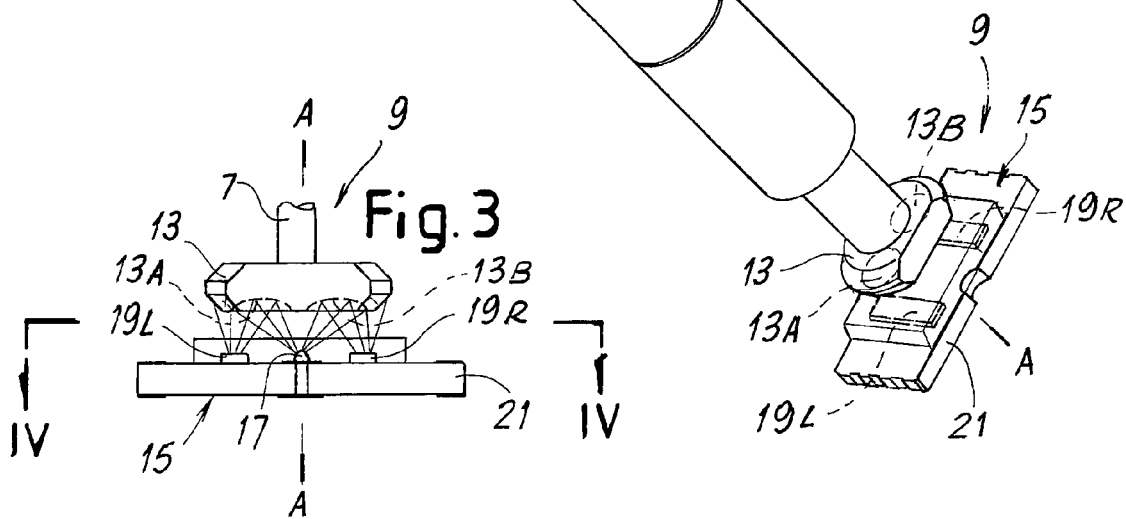
FIG. 3 shows a schematic view of the mirror and of the system emitter-detectors.
Figure 4:
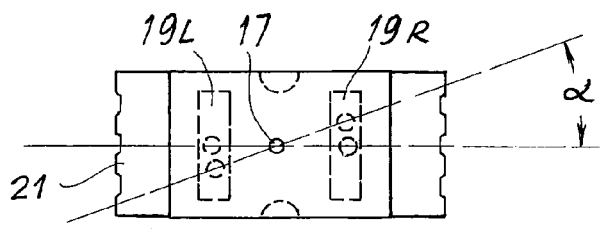
FIG. 4 shows a view according to IV-IV in FIG. 4.

In front of and coaxially to the mirror 13 is arranged the opto-electronical part of the device 9, which comprises one emitter and one pair of receivers. In one embodiment, the emitter is an infrared emitter and is arranged coaxially to the shaft 7 and, hence, to the mirror 13. The emitter can comprise one emitting diode (LED), for example a diode emitting at 800 nm. In FIGS. 3 and 4 the emitter is indicated with the number 17.

To the side of the emitter 17, in symmetrical positions with respect to the axis A-A, two electro-optical detectors are arranged, which are sensitive to the position, called "position-sensitive detectors" (PSD), indicated with 19L, 19R, each of which has a structure and a function which will be better described with reference to the following FIG. 5. In one embodiment these components (emitter 17, electro-optical detectors 19L, 19R) are provided in DIE, assembled through wire-bonding technology on a substrate 21 made for example of vetronite, alumina or other suitable material, and encapsulated with resin transparent to the radiations at the wavelength at which the emitter 17 and the detectors 19L, 19R work, so as to form a single device which can be easily handled.

For correct functioning, the electro-optical part 15 comprising the elements 17, 19L, and 19R must be arranged ad a predetermined distance from the mirror surface, and there is no need of interposing other elements. In this way it is possible to have a compact assembly.

As schematically indicated in FIG. 3, the reciprocal position of the emitter 17, of the electro-optical detectors 19L, 19R and of the mirror 13 with the concavities 13A, 13B is such that the beam emitted by the emitter 17 is reflected at least partially by the concave areas 13A, 13B of the mirror and focused in two spots on the sensitive surface, one on each of the electro-optical detectors 19L, 19R.

For a rotation by an angle α of the shaft 7, the spots focused by the mirror 13 on the surfaces of the detectors 19L, 19R are deflected by the same angle α. This displacement causes the variation of the output currents of the detectors 19L, 19R, as will be described hereunder.

Figure 5A:
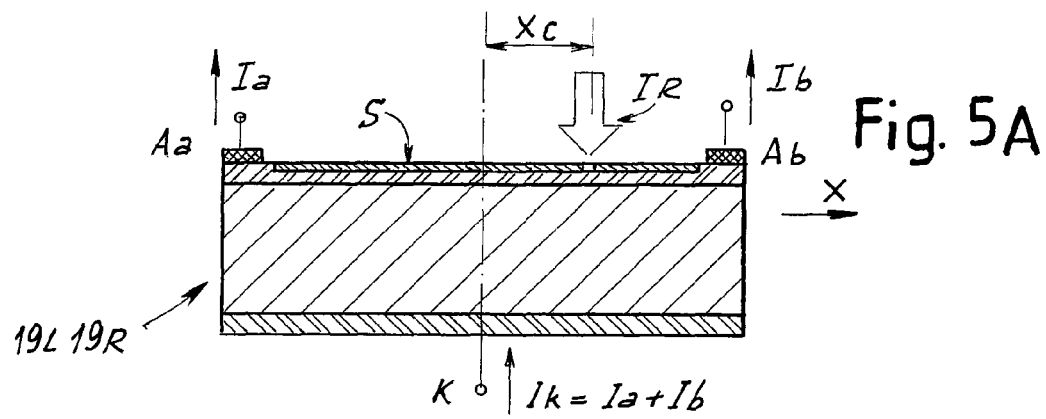
FIGS. 5A, 5B show respectively a section of one of the electro-optical detectors according to a plane orthogonal to the sensitive surface of the detector, and an axonometric schematic view of the detector.
Figure 5B:
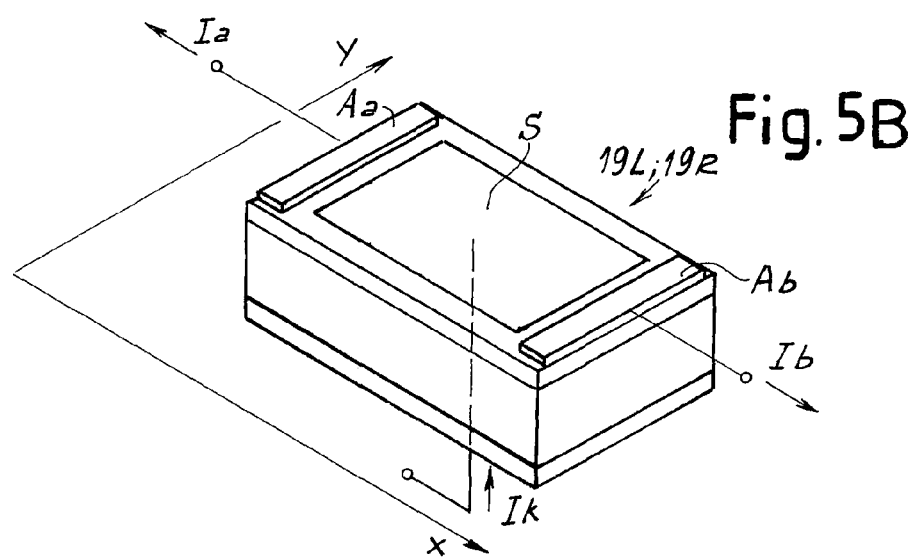

In one embodiment, the detectors 19L, 19R are of the resistive substrate type, which structure is indicated in FIGS. 5A and 5B. The two detectors 19L, 19R are substantially identical, and therefore each of them presents the same structure described hereunder with reference to FIG. 4.

Substantially, the electro-optical detector 19L, 19R consists of a light-sensitive element with three electrodes indicated as cathode (K), anode-a (Aa) and anode-b (Ab). The anodes Aa and Ab are obtained in a layer p of the detector. On this layer p, between the anodes Aa and Ab, an area S extends, which is sensitive to the incident electro-magnetic radiation, indicated here with IR. The cathode K is obtained on a substrate n of the detector. The two layers p and n are separated by an intermediate layer i.

When the spot of electro-magnetic radiation focused by the respective concavity 13A or 13B of the mirror 13 impinges on the sensitive area S, in the area affected an electric charge is produced, which is proportional to the incident luminous energy. This charge, in presence of a polarization field between the layers n and p, is gathered by the two electrodes Aa and Ab in two currents $I_a$ and $I_b$, whose sum, equal to $I_k$, is proportional to the total incident luminous power, whilst the difference of the currents $I_a-I_b$ is proportional to the position of the centroid of the light radiation along the axis X of the sensitive surface. Small displacements of the centroid of the light radiation along the axis Y of the sensitive surface do not determine significant variations in the difference $I_a-I_b$. Indicating with Xc the distance between said centroid and the center line of the sensitive area S, the following is obtained $$X_c = C * \frac{I_a - I_b}{I_a + I_b} = C * \frac{I_a - I_b}{I_k} \quad (1)$$

where C is a constant which depends upon the electro-physical characteristics of the electro-optical detector.

Maintaining $I_k$ constant, it can be included in a constant $C_k$ defined as $$C_k = \frac{C}{I_k} \quad (2)$$

and, thus:

$$X_c = C_k^*(I_a - I_b)$$

Therefore, the electro-optical detector allows to detect the position Xc of the luminous spot with respect to the axis X based on the difference between the currents $I_a$ e $I_b$, provided that the sum of the currents $I_k=I_a-I_b$ is constant.

In view of the above description, it is clear that by producing a signal as a function of the difference $I_a-I_b$ it is possible to detect the position of the spot of electromagnetic radiation focused on the sensitive area S of a single detector and, from this, to obtain directly the angular position of the shaft 7.

Figure 5C:
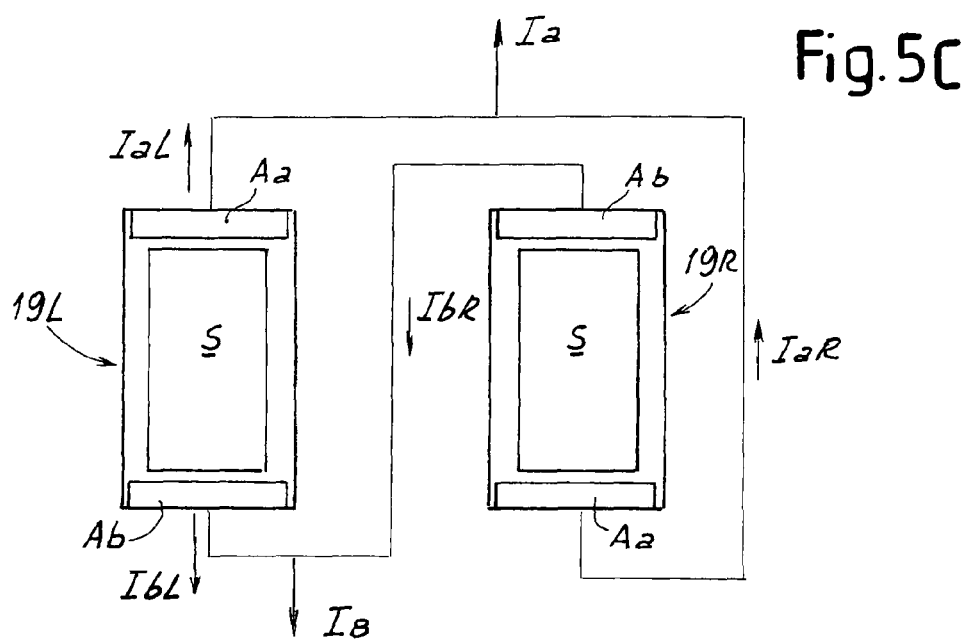
FIG. 5C shows a schematic indication of the electrical connection between the anodes of the two electro-optical detectors.

In order to improve the efficiency of the sensor device and to reduce the drift effects due to variations in the spatial distribution of power of the beam emitted by the emitter 17 as the temperature varies, or the errors due to small asymmetries during assembly, according to a preferred embodiment of the present invention the two electro-optical detectors 19L, 19R are used, in the configuration already described with reference to FIGS. 3 and 4, which are symmetrical opposite, and with the anodes arranged diagonally, i.e. as schematically indicated in FIG. 5C.

In this case:

$$X_c = C_k^*((I_{aL}+I_{aR})-(I_{bL}+I_{bR})) \quad (3)$$

where $I_{aL}$; $I_{aR}$; $I_{bL}$, $I_{bR}$ indicate the currents of the anodes Aa and Ab of the detector 19L and 19R respectively, according to the notation that is evident from the diagram in FIG. 5C, and $C_k$ constant.

In this way, if, due to a temperature variation, the emission profile of the emitter 17 should change, for example, displacing the centroids of the light spots impinging on the detectors 19L, 19R, thus on the detector 19L the current, exiting from the electrode toward which the center of gravity had moved, will increase, but on the detector 19R, as the centre of gravity has moved in the same manner, but electrically in the opposite direction, the current exiting from the electrode will decrease by the same quantity, being the two electrodes connected, the current will remain unchanged.

In order to better understand the advantages of the described device, it should be noted that the intensity profiles of the spots impinging on the detectors 19L, 19R are the resultant of the profile of the beam emitted by the emitter 17 and of the concave surfaces 13A, 13B of the mirror. Acknowledging small irregularities due to the quality of the two elements, the spots profiles can have a more or less indented and asymmetrical shape, but always with precise centroids Xc-L and Xc-R, whose positions will depend exclusively upon the angle of rotation of the shaft 7.

In the rest position (α=0) the spots are at the center of the sensitive areas S, i.e. on the center line thereof in central position with respect to the respective anodes, and Xc−L=0 and Xc−R=0. The rotation of the mirror 13 by a given angle causes a rotation of the image of the spots equal to the same angle. Consequently, the spots will move on the PSD by the quantity:

$$Xc = D^*\sin(\alpha) \quad (3)$$

However, the errors in determining the displacement of Xc caused by the rotation of the mirror will be minimal, as the intensity and profile variation of the spots due to defects is minimal, as the beam is in axis with the shaft and the portion of mirror affected does not change.

The currents $I_a$ and $I_b$, obtained from the sum of the currents on the anodes Aa and Ab of the two detectors 19L, 19R electrically connected as shown in FIG. 5C, are converted in voltage by two transconductance amplifiers and the resulting voltages $V_a$ and $V_b$ are sent to a differential amplifier from which a signal $V_{Pos}$ is obtained, which is proportional to the position α of the shaft 7.

Figure 6:
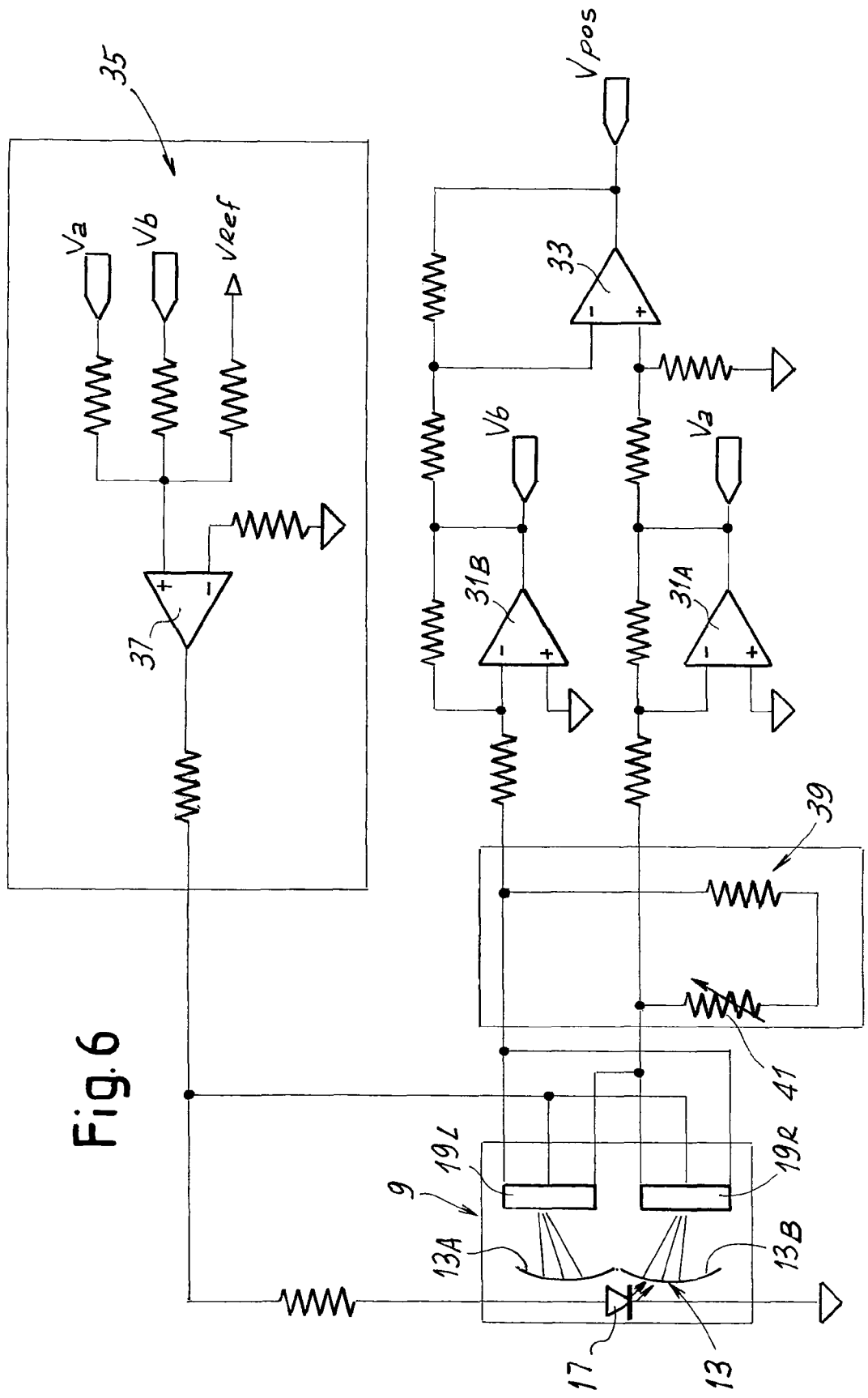
FIG. 6 shows the wiring diagram of a conditioning and measurement circuit.

FIG. 6 shows in greater detail the wiring diagram of the conditioning and measurement circuit of the signal produced by the electro-optical detectors 19L, 19R. In the diagram of FIG. 6, 31A and 31B indicate the two transconductance amplifiers, and 33 indicates the differential amplifier.

At the inlet of an automatic gain control circuit 35 (AGC) are summed the voltages $V_a$ and $V_b$ proportional to the currents $I_a$ and $I_b$. The voltages $V_a$, $V_b$ and a reference voltage $V_{ref}$ are applied, through respective resistors, to the non-inverting terminal (+) of an amplifier 37, the inverting terminal of which is earthed. Therefore, at the output of the amplifier 37 there is a signal which drives the emitter 17 controlling the supply thereof so as to maintain the current $I_k=I_a+I_b$ constant, and the equation (2) is realized.

From experimental tests on over 200 specimens tested, it has been found a correspondence between the output voltage $V_{Pos}$ and the angle of rotation of the shaft:

$$V_{Pos} \cong 0.5 * \alpha_{-20° \leq \alpha \leq +20°} \quad (4)$$

The non-linearity error measured on the over 100 devices tested was:

$$\in < 0.1\%_{-15° \leq \alpha \leq +15°} \quad (5)$$

$$\in < 0.2\%_{-20° \leq \alpha \leq +20°} \quad (6)$$

The radiant power variations with the temperature, typical of the infrared emitters like emitter 17, are balanced by the circuit 35. From experimental tests on over 200 specimens, a thermal drift was measured of the sensitivity of the sensor of about +400 ppm/° K on a range of temperatures between 15° C. and 60° C. This drift badly balanced by the circuit 35 is due to the variation of the interelectrode resistance of the electro-optical detectors 19L, 19R. This variation depending upon the temperature is typical of this type of electro-optical detectors, and makes the coefficient "C" indicated in the equation (1) to vary.

This drift was reduced to very low value (±50 ppm/° K) by inserting in parallel to the electrodes Aa and Ab of the two detectors 19L, 19R, a resistive network 39 (FIG. 6) containing a resistor 41 with negative thermal coefficient thermally connected to the two detectors 19L, 19R.

In the described embodiment, a pair of PSD (Position-Sensitive Detectors) was used of the one-dimensional type, i.e. able to identify a displacement along a direction (axis X, FIGS. 5A, 5B). With this architecture a good resolution is obtained for angular displacements of some tens of degrees (typically for example within about 40°). However, it should be understood that the arrangement can be different from the one illustrated, according to the different detections needs. For example, it is possible to use a greater number of electro-optical detectors, or bidimensional electro-optical detectors (PSD), also depending upon the value of the angular displacement that one wants to detect.

The electro-optical detectors of the PSD type are components known in the industry and they are used in many applications, where it is necessary to detect a displacement with accuracy. They are, as described above, affected by a thermal drift. Currently, the problem of this thermal drift is not solved in an adequate manner. Within the above description, a specific application was described of a pair of electro-optical detectors of the PSD type, wherein the thermal drift is corrected by means of the use of a compensation circuit containing a resistor variable with the temperature and more in particular a NTC, i.e. a negative temperature coefficient resistor. This resistor, in thermal contact with the detector element PSD and inserted in the compensation circuit, allows to compensate the thermal drift. This solution is efficient and at low cost, and can be used in any application of PSD detectors in which a compensation of the thermal drift is required.

Therefore, it is a specific object of the present invention also a generic detection device comprising an electro-optical detector of the PSD type with a compensation circuit for drift compensation comprising a resistor variable with the temperature, and in particular a NTC resistor. It is an object of the present invention also a compensation method for compensating the thermal drift of a PSD detector through a compensation network comprising a resistor variable with the temperature, and in particular a NTC resistor, in thermal contact with the PSD detector.

It is understood that the drawing merely shows a possible embodiment of the invention, which may vary in forms and layouts without however departing from the scope of the concept on which the invention is based. Any reference numbers in the claims hereunder are provided purely to facilitate the reading thereof in the light of the description and of the attached drawings, and do not in any way limit the scope of protection of the claims.

The invention claimed is:

1. An optical device for detecting the angular position of a rotating element, comprising:
   a concave mirror integral with a rotating member;
   an emitter of electro-magnetic radiation;
   at least one electro-optical detector, wherein said concave mirror, said emitter and said detector are arranged in such a way that at least a part of the radiation emitted by said emitter is focused by said concave mirror on said at least one detector, and wherein the detector produces a variable signal as a function of the position in which the radiation is focused by the mirror on the detector.

2. A device as claimed in claim 1, wherein said emitter is substantially coaxial to said rotating member.

3. A device as claimed in claim 1, wherein said emitter and said at least one detector are arranged on a common support.

4. A device as claimed in claim 1, wherein said concave mirror comprises a double concavity to focus said electro-magnetic radiation on two electro-optical detectors opposite to said mirror.

5. A device as claimed in claim 4, wherein said mirror comprises two concave areas substantially symmetrical with respect to the axis of rotation of said rotating member; and wherein said two detectors are arranged in positions which are substantially symmetrical with respect to said axis of rotation.

6. A device as claimed in claim 4, wherein said emitter and said two detectors are arranged on a common substrate, the detectors being arranged in positions which are substantially symmetrical with respect to said emitter.

7. A device as claimed in claim 4, wherein said emitter and said detectors are encapsulated in a resin transparent to the radiation of said emitter.

8. A device as claimed in claim 4, wherein said electro-optical detectors are arranged in such a way as to produce a differential signal as a function of the angular position of said mirror.

9. A device as claimed in claim 1, wherein:
   each of said electro-optical detectors comprises a cathode and two anodes;

between said two anodes alight-sensitive area is arranged, which extends according to a longitudinal direction between said two anodes; and said mirror focuses the electro-magnetic radiation on said light-sensitive area.

10. A device as claimed in claim 9, wherein the orientation of the sensitive area of each electro-optical detector with respect to said mirror is such that the rotation of the mirror around said axis causes a movement of the spot of radiation focused by the mirror on the light-sensitive area, said movement presenting a main component along said longitudinal direction.

11. A device as claimed in claim 9, further comprising two detectors, whose anodes are diagonally connected.

12. A device as claimed in claim 1, wherein said mirror is made of molded synthetic resin.

13. A device as claimed in claim 12, wherein said double concavity is produced by molding from a single block of synthetic resin.

14. A device as claimed in claim 1, wherein said detectors (s) and said emitter are connected to a circuit for conditioning and measuring the signal produced by said detector(s).

15. A device as claimed in claim 14, wherein said conditioning and measurement circuit comprises an automatic control of the emission intensity of the emitter, in order to maintain the signal delivered by said detector(s) substantially constant by controlling the supply voltage of the emitter.

16. A device as claimed in claim 14, further comprising two electro-optical detectors, and wherein said automatic control of the emission intensity of the emitter receives at the input a signal as a function of the sum of the currents produced by said two electro-optical detectors and controls said emitter so that said sum remains substantially constant.

17. A device as claimed in claim 14, wherein said conditioning and measurement circuit comprises a compensator for compensating the thermal drift of the sensitivity of said electro-optical detector(s).

18. A device as claimed in claim 17, wherein said thermal drift compensator comprises a resistor variable with the temperature.

19. A device as claimed in claim 18, wherein said resistor variable with the temperature is a NTC resistor.

20. A device as claimed in claim 17, wherein said compensator comprises a resistive network with negative thermal coefficient, thermally connected to said electro-optical detector(s).

21. A device as claimed in claim 1, wherein said emitter is an infrared emitter.

22. A device as claimed in claim 1, wherein said at least one electro-optical detector is a PSD (position-Sensitive detector).

23. A device as claimed in claim 1, wherein said rotating member rotates around an axis substantially coinciding with the optical axis of the optical system formed by said emitter, by said detector and by said concave mirror.

24. An equipment comprising:

a movable element and an actuator to control said movable member with a rotating movement, wherein to said movable member is associated a detection device, said detection device comprising:

a concave mirror integral with a rotating member;

an emitter of electro-magnetic radiation;

at least one electro-optical detector, wherein said concave mirror, said emitter and said detector are arranged in such a way that at least a part of the radiation emitted by said emitter is focused by said concave mirror on said at least one detector, and wherein the detector produces a variable signal as a function of the position in which the radiation is focused by the mirror on the detector.

* * * * *

UNITED STATES PATENT AND TRADEMARK OFFICE
CERTIFICATE OF CORRECTION

| | | |
|---|---|---|
| PATENT NO. | : 8,184,277 B2 | Page 1 of 1 |
| APPLICATION NO. | : 12/528501 | |
| DATED | : May 22, 2012 | |
| INVENTOR(S) | : Bove et al. | |

It is certified that error appears in the above-identified patent and that said Letters Patent is hereby corrected as shown below:

Title page, Item (30) should read:

Foreign Application Priority Data is FI2007A000050.

Signed and Sealed this
Fourteenth Day of August, 2012

David J. Kappos
*Director of the United States Patent and Trademark Office*